Jan. 6, 1970   B. J. PERSSON ET AL   3,487,902
CLUTCH DEVICE
Filed Oct. 12, 1967   5 Sheets-Sheet 1

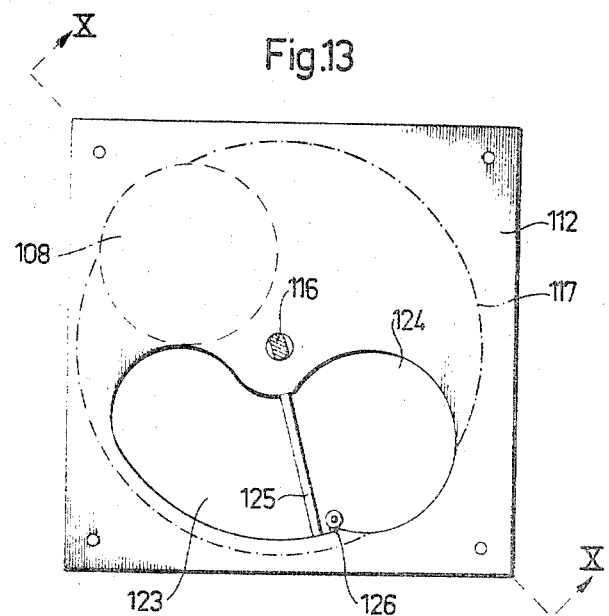

United States Patent Office 3,487,902
Patented Jan. 6, 1970

1

3,487,902
CLUTCH DEVICE
Bertil J. Persson, Lund, and Jim A. Nissmo, Staffanstrop, Sweden, assignors to Scan Coin AB, Malmo, Sweden, a corporation of Sweden
Filed Oct. 12, 1967, Ser. No. 674,871
Claims priority, application Sweden, Nov. 10, 1966, 15,366/66
Int. Cl. F16d *43/20;* G07d *3/00*
U.S. Cl. 192—56            17 Claims

ABSTRACT OF THE DISCLOSURE

This invention pertains to a clutch device that is particularly useful in connection with coin counting machines. This clutch is intended to connect two parts to an extent depending upon the moment of torsion transmitted. When the moment of torsion is too great the parts disengage and exert a snap-back action.

---

The present invention relates to a clutch, preferably intended to be used in a coin counting machine together with a device of the kind described in the Swedish patent application 14,278/66. The clutch may however also be used more generically.

More precisely, the invention relates to a clutch intended for connecting two parts, which should engage each other in dependence upon the moment of torsion transmitted, one part being inserted into a hole of the other part. The clutch according to the invention is characterized by the fact that one of the parts within the hole is provided with a groove running in the direction of the rotation, said groove being at one or more places interrupted by stopping means; and by the fact that the other part, also within the hole, is provided with one or more driving means, extending into said groove in such a way that the driving means and the stopping means, when the parts rotate in relation to each other, engage each other, the driving means and/or the stopping means being resiliently mounted in such a way that the parts are able to rotate together only as long as the moment of torsion transmitted is not large enough to cause the driving means and/or the stopping means to disengage by springing back resulting in a back motion of the driven part due to a back snapping; and in that the driving means and the stopping means are arranged in such a way that by said spring back they entirely disengage the other part, entirely disenaging the driving connection until said means once more engage each other in a very accurate position within a few degrees.

In coin counting devices you often have the problem that a coin becomes jammed. If positive driving clutches are used, a jamming may entirely destroy the apparatus. If one attempts to avoid this problem by using friction clutches, such clutches may render the jamming more difficult. At the same time those clutches are rapidly worn out. Furthermore, there is a risk of heating said clutches too much.

The clutch according to the present invention has none of the above mentioned draw backs. Instead, the clutch has, due to the fact that it by jamming works with snapping motions, a tendency of removing eventual jamming.

In a first embodiment of the clutch according to this invention the driving means consists of a ball placed in a radial cavity of a casing, said ball being pressed by a spring into the groove of a shaft. The cavity is a through bore, the outside of said bore being surrounded by a slitted spring ring that grasps the casing by a spring fit.

The stopping means may consist of a resilient wire, pin or another spring, placed across the groove of the shaft,

2 the ends of the spring being anchored to the shaft by being immersed into wedge-shaped grooves at each side of the peripherical groove of the shaft. If the driving means consists of a ball as described above, the peripheral groove should have the shape of a segment of a circle, the wedge-shaped grooves extending into the peripherical groove, however, without meeting each other. Preferably, the shaft is mounted in the casing with an easy rotating fit and, at the same time the wedge-shaped grooves of the shaft are made at least as deep as the thickness of the spring wire placed in the grooves.

The invention includes also further embodiments, some of which will be described more in detail below. The clutch may, for example, be provided with additional means in order to intensify the back snapping of the driven part automatically received. In order to better illustrate the advantages of the invention, the coin sorting device to which the clutch according to the invention is intended to be applied will also be described below.

The invention will be described more in detail by reference to the attached drawings, which by the way of example show some different embodiments of the invention, and said coin sorting device.

FIGS. 11–13 show sections along the lines XI—XI, XII—XII, and XIII—XIII of FIG. 10.

Figure 1:
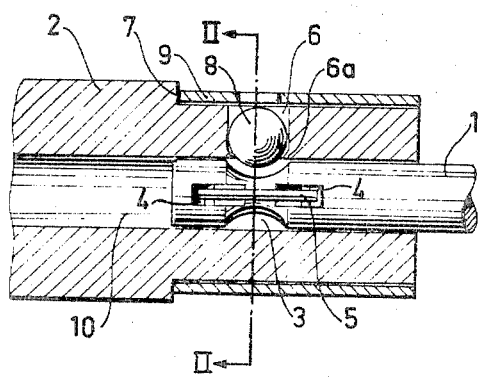
FIG. 1 shows an axial section through a first embodiment of the invention.
Figure 2:
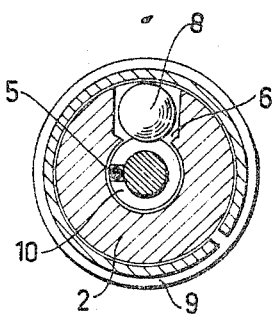
FIG. 2 shows a section along the line II—II of FIG. 1.

FIGS. 1 and 2 show a shaft 1 connected to a casing 2. The shaft 1 has a peripherical groove 3 running all around the shaft, and two wedge-shaped grooves 4 placed across said groove 3. In said grooves 4 a resilient thread 5 is placed across the groove 3. Member 5 is a stopping means and may consist, for example, of a stationary elevation, shoulder, pin, or the like in groove 3. The casing 2 is provided with a bore 6 and a shoulder 7. A ball 8 is placed within the bore 6, said ball 8 being retained in the bore 6 by means of a slitted spring ring 9 threaded upon the part of the casing 2, formed by the shoulder 7.

The reference numeral 10, finally, represents the hole of the casing 2.

If a moment of torsion should be transmitted from the casing 2 to the shaft 1, the clutch works in such a way that firstly the casing turns until the thread 5 engage the ball 8. By this engagment the shaft 1 is driven. If however the shaft 1 is stopped due to a jamming of a coin, when for example the clutch is being used in order to drive a device of a coin counting apparatus, the ball 8 is pressed outwardly in the bore 6 against the action of the spring ring 9, and, at the same time the thread 5 is resiliently bent. By this action the ball 8 climbs the thread 5. When the ball has passed over the thread 5, it falls back down into the groove 3 and, at the same time it gives the shaft 1 a back snapping motion. This back snapping motion is often enough to eliminate the cause of the jamming. In order to prevent the ball 8 from engaging the bottom of the groove 3 and by mistake, due to friction for example, drive the shaft, the hole 6 is at its inner edge provided with periperal flange 6a.

Figure 3:
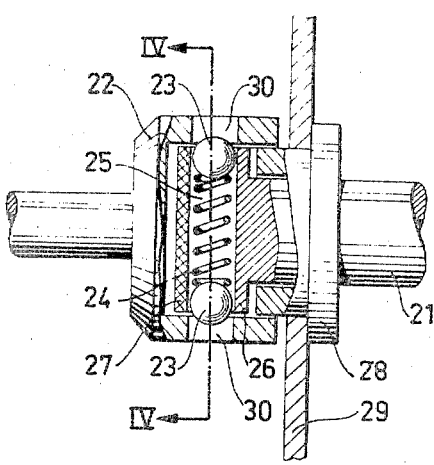
FIGS. 3 and 4 show corresponding sections through a second embodiment of the invention, FIGURE 4 being taken along IV—IV of FIGURE 3.
Figure 4:
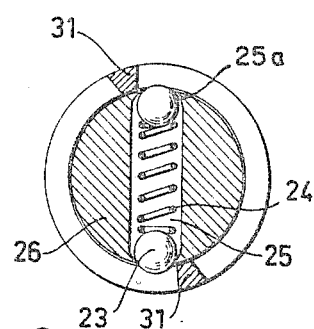

FIGS. 3 and 4 show a shaft 21 connected to a casing 22. In this embodiment the shaft is provided with resilient driving means consisting of balls 23, which are pressed outwardly by means of a spring 24, said spring 24 being together with the balls 23 placed in a radial groove 25. Said groove 25 is made by using an end cutter at the end 26 of shaft 21, said end 26 being formed larger than the rest of the shaft. Due to the fact that the cutting of the groove 25 has been interrupted before the largest diameter of the end cutter has reached the periphery of the end 26, the groove 25 has side walls 25a converging against the ends of the groove, said walls retaining the balls 23 in a radial direction. Axially the balls 23 are retained by means of a cover plate 27 fixed to the end 26 of the shaft 21. The shaft 21 is mounted in a preferably self-lubricating bearing 28 in a machine plate 29, which may be a part of a coin counting machine of the kind described above. The shaft 21 is intended to be the driving part of the clutch. Consequently, it drives the casing 22, which is provided with a groove formed by two peripherical successive through slits 30. Those slits 30 are separated from each other by studs 31 constituting the stopping means mentioned above. The embodiment according to FIGS. 3 and 4 works in exactly the same way as the embodiment according to FIGS. 1 and 2. Consequently, the function does not need to be described.

A primary object of the invention is to prevent break down of a coin counting machine due to jamming. Said object is accomplished by the above described embodiments of the invention, having a natural tendency of removing an eventual jamming. Said tendency may according to the invention be further intensified by means of the additional means shown in FIGS. 5-8.

Figure 5:
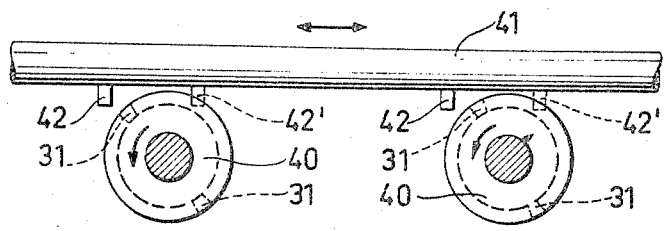
FIGS. 5–8, show clutches according to the invention coupled in a two and two parallel relationship and provided with special means in order to intensify the back snapping motion of the driven part of the clutch automatically received by disengagement.

FIG. 5 shows two clutches 40 of the kind described in FIGS. 3 and 4 and coupled in parallel relationship. The additional means consists of a rod 41 provided with pins 42, which are displaced in synchronism with the motion of the clutches between the position shown by the solid lines and the position shown by the broken lines and designated by the numeral 42. The motion of the clutches is counterclockwise. If any of the stopping means has been stopped within the path of the pins 42, said means is urged to carry out a back motion, which normally removes the jamming. If on the other hand the stopping means 31 are running normally, the motion of the pins is adjusted in such a way that nothing happens. As may be seen in FIG. 5 the motion path of the pins 42 intersect the motion path of the stopping means only within a very short range. The reason behind this fact is that one may, by most machines and especially by coin counting machines, may carefully, determine in which positions a jamming occur. If many such positions are possible, a corresponding number of pins 42 are arranged for the critical parts of the path of the studs 31.

Figure 6:
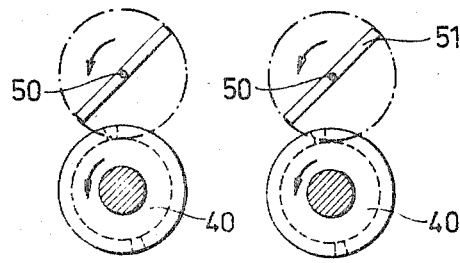

Also FIG. 6 shows two clutches 40 of the kind described in FIGS. 3 and 4 and coupled in parallel relationship. The additional means consists of rods 51 mounted on shafts 50 which are parallel to the driving shafts of the clutches, and working in the same way as the pins 42. Consequently, the shafts 50 are driven in synchronism with the clutches 40 in such a way that the rods 51 normally do not engage the stopping means of the clutches, but such an engagement will be made as soon as the driven and driving parts of the clutches 40 disengage.

Figure 7:
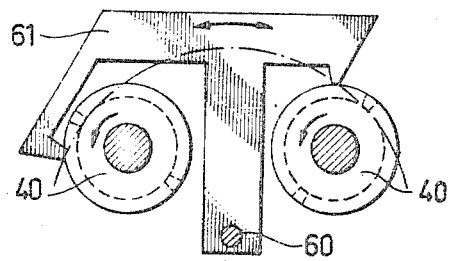

The embodiment according to FIG. 7 corresponds to the embodiment according to FIG. 6 except that the shafts 50 and the rods 51 are replaced by only one shaft 60 and one rocking lever 61. This embodiment has the advantage that the motion path of the rocking lever may be brought to coincide with the paths of the stopping means of the clutches a longer way, since it is bent in the same direction as said paths.

Figure 8:
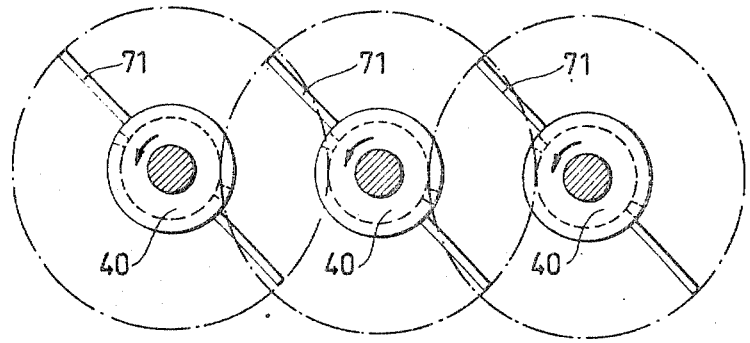

FIG. 8 finally shows three clutches 40 coupled in parallel relationship, the clutches being provided with transverse arms 71 working in exactly the same way as the rods 51 described in connection with FIG. 6.

By the constructions shown in FIGS. 5-7 the snapping intensifying means should be driven by a motor in synchronism with the driving part of the clutch proper. Said means may however also be driven quite manually, being actuated only when the apparatus is being stopped.

Figure 14:
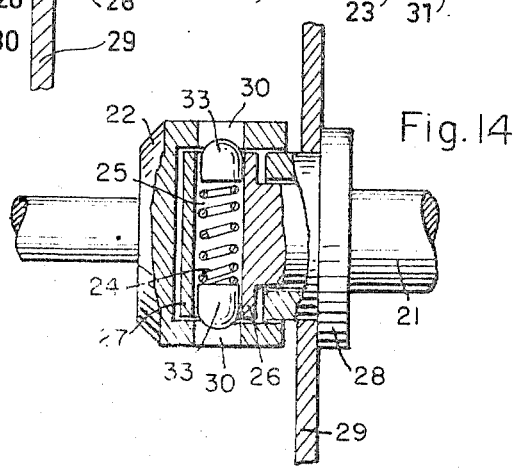
FIGURE 14 is a view similar to FIGURE 4 showing a modification of the present invention.

The invention is of course not restricted to the embodiments described above only, but may be varied within the scope of the following claims. Accordingly, the clutch according to the invention may be used more generically than only by coin counting machines. Furthermore, the thread 5 and the grooves 4 of the first embodiment described, may be replaced by a stationary cam-like raised part in the groove 3. However, in practice, the shown arrangement has proved to be the best arrangement. With small clutches the thread 5 may be a short piece of a music wire. The length of the wire should be large enough to insure that the wire will retain in the grooves 4 also by a maximum down deflection into the groove 3. Preferably, the casing 2 is provided with a through bore 6, but said bore may be replaced by a cavity at the inside of the hole 10 only. Finally, the ball 8 may of course be replaced by a pin having a rounded end profile and extending down into the groove 3. This construction is shown in FIGURE 14 of the drawings wherein parts similar to those previously described have been given the same reference numerals primed. The pins are indicated by reference characters 33 as seen in FIGURE 14. By the word "casing" any machine element is meant that is intended to be rotated as a driven or driving part in a clutch, and provided with a hole, in with a shaft may be inserted in order to provide a connection according to the principles described above. In the embodiment shown the casing 2 should be the driving part, but it may of course also be the driven part. Modifications as described in connection with the embodiment according to FIGS. 1 and 2 may of course also be made in connection with the embodiment according to FIGS. 3 and 4.

The construction according to FIGS. 3 and 4 has in the same way as the construction according to FIGS. 1 and 2 the advantage, that the balls 23 entirely disengage the casing 22, when they resiliently run away from the studs 31. Thanks to this fact the risk is avoided, that the casing due to friction should be driven by the shaft 21 without synchronism. Such a motion may, especially in coin counting machines, be accompanied by troubles, in that coins are brought up to a counting device, for example, when said device is not prepared to count.

The invention is as mentioned preferably intended to be used in connection with a coin sorting device. In order to illustrate the advantages gained hereby, our invention will be described briefly below arranged as a part of a coin counting machine in which the coins are being sorted twice.

Figure 9:
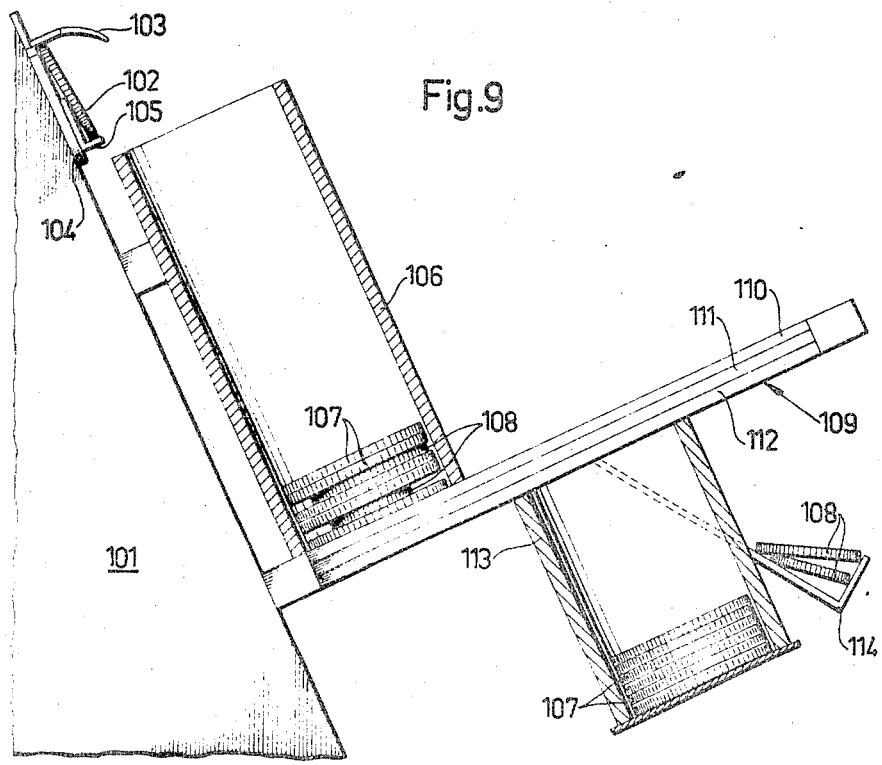
FIG. 9 shows a side view, partly in section, of the coin sorting device to which the clutch according to the invention is intended to be applied.

In FIG. 9 the coin counting machine to which the coin sorting device according to the invention is applied is given the reference numeral 101. Said machine is provided with a coin sorting ruler along which coins 102 of different sizes travel to coin deflecting knives 103. The ruler consists of two parts, namely, an inner base part 104 and an outer bent part 105. When coins of a certain size reach the knife 103, they are deflected down into a coin tube 106. In connection with this deflection it may happen, due to a grain of sand on the ruler 104, 105 or due to other unfavorable circumstances, that coins 108 of a wrong size may fall down into the tube 106 together with the coins 107 of the size desired. Due to this fact the sorting operation has to be repeated. The second sorting operation is made by using the device shown.

The shown device includes, besides the coin tube 106 enclosing the pile of coins 107 and 108, a coin sorting housing 109 consisting of three plates 110, 111, and 112, a coin collecting tube 113 intended for coins 107 of the size desired, and a coin collecting table 114 easily viewable from the outside of the machine and intended for coins 108 which by a mistake have been sorted down into the coin tube 106 in spite of the fact that they are too small.

Figure 10:
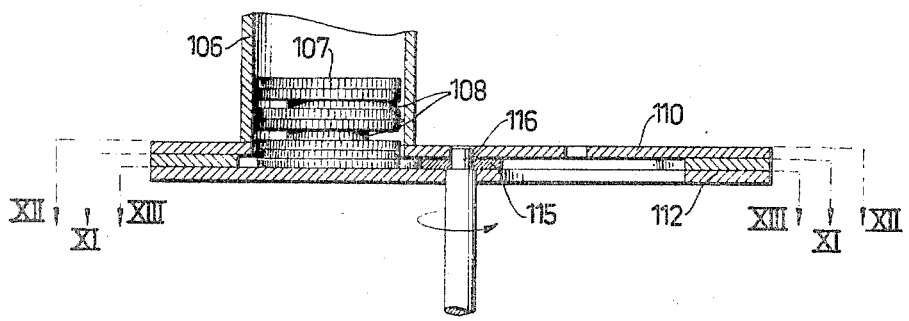
FIG. 10 shows a section through a coin tube of said device and through a coin sorting housing of said device.
Figure 11:
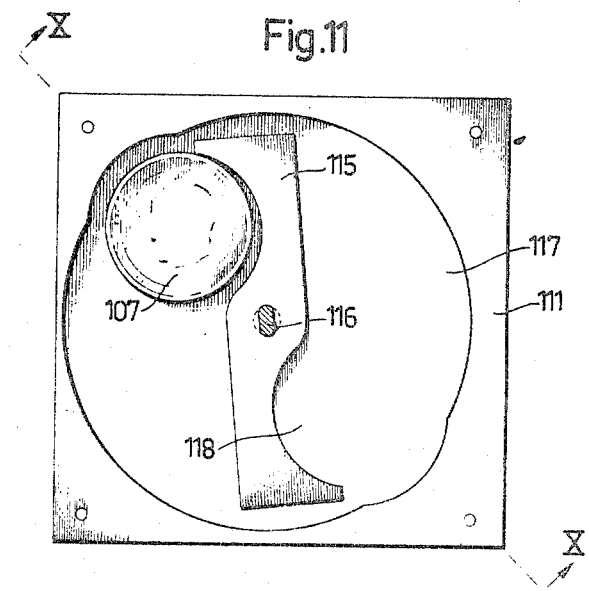

As may be best seen from FIGS. 10 and 11, the coin sorting housing 109 encloses a coin driver 115 arranged on a continuously rotatable shaft 116. The coin driver 115 consists of a double-armed bar; which at each end is provided with cuts 118 fitting to the coins 107. The coin driver 115 is enclosed in the midde plate 111 which is provided with a circular hole 117 having a somewhat larger diameter than the length of the coin driver 115. If the coin driver is given a suitable curvature beside the cuts, it provides together with the wall of the hole 117 a coin path having a width somewhat larger than the desired coin size and arranged symmetrically in relation to said tubes.

Figure 12:
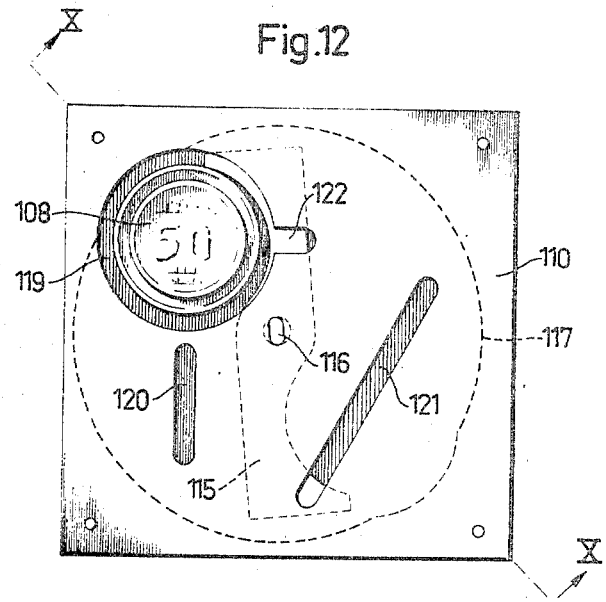

The upper plate 110 of the coin sorting housing 109 includes, as may be best seen from FIG. 12, on the one hand a hole 119 fitting to the coins 107 and 108 and to coin tube 106, and on the other hand a number of inspection slits 120, 121, and 122. Those slits are arranged in such a way that the user of the machine always is able to reach and to release coins or other articles which may have been jammed in the coin sorting housing.

The bottom plate 112 of the coin sorting housing 109 includes, as may be best seen from FIG. 13, a hole 117 which provides two orifices 123 and 124 separated by a partition wall 125. Close to said wall 125 a trigger arm 126 is placed. Said arm is a part of a micro switch included in a coin counting system counting the coins sorted of the size desired.

The device shown works in the following way. The cuts 118 of the coin driver 115 engage, each time they pass the coin pile of the tube 106, a coin to bring said coin across the orifice 123 to the orifice 124. If the coin engaged is to small, it falls through the orifice 123 via a tube down to the coin collecting table 114 intended for such coins and shown in FIG. 9. If the coin is of the size desired, it falls instead through the orifice 124 down into the coin collecting tube 113. It cannot be too large since, in that case, it will be stopped on the sorting ruler 104, 105 before getting to the knife 103. Each time a coin of the size desired falls down into the coin collecting tube 113 it has previously actuated the trigger arm 126 in order to be counted.

We claim:
1. A clutch assembly including
    (a) a first part and a second part, that are designed to engage each other in accordance with the moment of torsion transmitted,
    (b) said first part extending into a passageway located in said second part,
    (c) said first part being provided with a peripheral groove arranged in a plane perpendicular to the axis of rotation of said first part,
    (d) said groove being provided with at least one stopping means,
    (e) said second part being provided with at least one driving means,
    (f) said driving means of said second part extending into said groove of said first part in such a way that by rotation of either of said parts the driving means and the stopping means engage each other,
    (g) at least one of said driving means and said stopping means being resiliently arranged in such a way that the parts are able to rotate only as long as the moment of torsion transmitted is not large enough to cause at least one of the aforesaid driving means or stopping means to disengage by springing back, resulting in a back motion of the driven part due to a back snapping, and in that the driving means and the stopping means are arranged in such a way that by said springing back they entirely disengage the other part, entirely disengaging the driving connection of the clutch until said means once more engage each other in a very accurate position, and means for limiting movement of said driving means toward said first part so that said driving means is completely out of contact with said first part when said driving means and said stopping means are disengaged.

2. A clutch assembly according to claim 1 wherein said two parts consist of a casing and a shaft respectively, said driving means consists of a ball positioned in a radial cavity and said ball is held therein by a spring means.

3. A clutch assembly according to claim 1 wherein the stopping means consists of a stationary elevation, shoulder, pin, or the like in the groove.

4. A clutch assembly according to claim 1 wherein said first part is provided with such a deep groove that the driving means of the other part does not engage the bottom of said groove.

5. A clutch assembly including
    (a) a first part and a second part, that are designed to engage each other in accordance with the moment of torsion transmitted,
    (b) said first part extending into a passageway located in said second part,
    (c) said first part being provided with a peripheral groove arranged in a plane perpendicular to the axis of rotation of said first part,
    (d) said groove being provided with at least one stopping means,
    (e) said second part being provided with at least one driving means,
    (f) said driving means of said second part extending into said groove of said first part in such a way that by rotation of either of said parts the driving means and the stopping means engage each other,
    (g) at least one of said driving means and said stopping means being resiliently arranged in such a way that the parts are able to rotate only as long as the moment of torsion transmitted is not large enough to cause at least one of the aforesaid driving means or stopping means to disengage by springing back, resulting in a back motion of the driven part due to a back snapping, and in that the driving means and the stopping means are arranged in such a way that by said springing back they entirely disengage the other part, entirely disengaging the driving connection of the clutch until said means once more engage each other in a very accurate position, said two parts consisting of a casing and a shaft respectively, said driving means consisting of a ball positioned in a radial cavity, said ball being held therein by a spring means, said stopping means consisting of a resilient wire placed across the groove of the shaft, the end of said wire being anchored in the shaft in wedge-like grooves located on each side of the groove.

6. A clutch assembly according to claim 5 wherein the groove of the shaft has a section having the shape of a segment of a circle, said wedge-like grooves extending into the peripherical groove without meeting same.

7. A clutch assembly according to claim 5 wherein the shaft is fitted into the casing so as to be freely rotatable and the wedge-like grooves of the shaft are at least as deep as the diameter of the thread placed into said grooves but not as deep as the peripherical groove.

8. A clutch assembly including
    (a) a first part and a second part, that are designed to engage each other in accordance with the moment of torsion transmitted,
    (b) said first part extending into a passageway located in said second part,
    (c) said first part being provided with a peripheral groove arranged in a plane perpendicular to the axis of rotation of said first part,
    (d) said groove being provided with at least one stopping means, (e) said second part being provided with at least one driving means, (f) said driving means of said second part extending into said groove of said first part in such a way that by rotation of either of said parts the driving means and the stopping means engage each other, (g) at least one of said driving means and said stopping means being resiliently arranged in such a way that the parts are able to rotate only as long as the moment of torsion transmitted is not large enough to cause at least one of the aforesaid driving means or stopping means to disengage by springing back, resulting in a back motion of the driven part due to a back snapping, and in that the driving means and the stopping means are arranged in such a way that by said springing back they entirely disengage the other part, entirely disengaging the driving connection of the clutch until said means once more engage each other in a very accurate position, said two parts consisting of a casing and a shaft respectively, said driving means consisting of a ball positioned in a radial cavity, said ball being held therein by a spring means, said radial cavity containing the ball being a through bore made in the casing, the casing outside said bore being surrounded by a slitted spring ring which surrounds the casing with a spring fit.

9. A clutch assembly including
(a) a first part and a second part, that are designed to engage each other in accordance with the moment of torsion transmitted,
(b) said first part extending into a passageway located in said second part,
(c) said first part being provided with a peripheral groove arranged in a plane perpendicular to the axis of rotation of said first part,
(d) said groove being provided with at least one stopping means,
(e) said second part being provided with at least one driving means,
(f) said driving means of said second part extending into said groove of said first part in such a way that by rotation of either of said parts the driving means and the stopping means engage each other,
(g) at least one of said driving means and said stopping means being resiliently arranged in such a way that the parts are able to rotate only as long as the moment or torsion transmitted is not large enough to cause at least one of the aforesaid driving means or stopping means to disengage by springing back, resulting in a back motion of the driven part due to a back snapping, and in that the driving means and the stopping means are arranged in such a way that by said springing back they entirely disengage the other part, entirely disengaging the driving connection of the clutch until said means once more engage each other in a very arcuate position, said driving means consisting of a pin inserted into a radial bore in said second part against the action of a spring, said pin extending into the peripheral groove with a rounded end.

10. A clutch assembly including
(a) a first part and a second part, that are designed to engage each other in accordance with the moment of torsion transmitted,
(b) said first part extending into a passageway located in said second part,
(c) said first part being provided with a peripheral groove arranged in a plane perpendicular to the axis of rotation of said first part,
(d) said groove being provided with at least one stopping means,
(e) said second part being provided with at least one driving means,
(f) said driving means of said second part extending into said groove of said first part in such a way that by rotation of either of said parts the driving means and the stopping means engage each other, (g) at least one of said driving means and said stopping means being resiliently arranged in such a way that the parts are able to rotate only as long as the moment of torsion transmitted is not large enough to cause at least one of the aforesaid driving means or stopping means to disengage by springing back, resulting in a back motion of the driven part due to a back snapping, and in that the driving means and the stopping means are arranged in such a way that by said springing back they entirely disengage the other part, entirely disengaging the driving connection of the clutch until said means once more engage each other in a very accurate position, said second part being provided with such a deep groove that the driving means of the other part does not engage the bottom of said groove, said second part consisting of a peripheral casing, said groove consisting of two peripherical slits in the wall of the casing, said slits being interrupted by studs serving as said stopping means, and said driving means consists of balls placed in radial cavities, said balls being pressed by spring means out into a position in which they engage said stopping means, support means being provided to prevent the balls from leaving the radial cavities.

11. A clutch assembly according to claim 10 wherein said balls are placed in an end piece fixed to a driving shaft and having an end wall provided with a radial groove, preferably cut by an end mill, the side walls of said groove converging against the ends of the groove, the balls being retained in the groove by means of a cover fixed to the outside of the end wall.

12. A clutch assembly including
(a) a first part and a second part, that are designed to engage each other in accordance with the moment of torsion transmitted,
(b) said first part extending into a passageway located in said second part,
(c) said first part being provided with a peripheral groove arranged in a plane perpendicular to the axis of rotation of said first part,
(d) said groove being provided with at least one stopping means,
(e) said second part being provided with at least one driving means,
(f) said driving means of said second part extending into said groove of said first part in such a way that by rotation of either of said parts the driving means and the stopping means engage each other,
(g) at least one of said driving means and said stopping means being resiliently arranged in such a way that the parts are able to rotate only as long as the moment of torsion transmitted is not large enough to cause at least one of the aforesaid driving means or stopping means to disengage by springing back, resulting in a back motion of the driven part due to a back snapping, and in that the driving means and the stopping means are arranged in such a way that by said springing back they entirely disengage the other part, entirely disengaging the driving connection of the clutch until said means once more engage each other in a very accurate position, and means being provided to intensify the snapping action automatically obtained from the driven part, when the driving means and stopping means return to their original position after springing away said intensifying means consisting of a positively driven means arranged to engage the driven part, to drive said part backwardly in dependence of whether or not said part has its motion in synchronism with the driving parts.

13. A clutch assembly according to claim 12 wherein said positively driven means consists of a pin arranged to be inserted in reverse direction to the paths of said stopping means and said positively driven means is arranged to be driven in synchronism with the driven and driving parts in such a way that it normally intersects the path of the stopping means without contacting any of said parts but engaging one of those parts if the driven part has ceased its motion in synchronism with the driving part.

14. A clutch assembly according to claim 13 wherein the same pin in different parts of its path may engage two clutches placed at each side of the shaft of the pin, said pin preferably constituting a transverse arm arranged on one clutch of a number of such clutches placed in line.

15. A clutch assembly according to claim 13 wherein said pin is arranged on an axially displaceable bar also provided with further such pins intended to actuate a corresponding number of clutches of the same kind and coupled in parallel relationship.

16. A clutch assembly according to claim 13 wherein said pin is arranged on a second shaft which is placed in parallel relationship with the driving shaft of the clutch and driven in synchronism with said shaft.

17. A clutch assembly according to claim 16 wherein said pin is arranged on a rocking lever in such a way that by the rocking motion of said arm it moves along a path which is curved toward the same direction as the motion path of said stopping means.

References Cited

UNITED STATES PATENTS

| | | | |
|---|---|---|---|
| 1,840,682 | 1/1932 | Sheldrick et al. | 64—29 |
| 2,017,591 | 10/1935 | Dumm | 64—29 |
| 2,164,870 | 7/1939 | Salardi | 64—29 |
| 2,881,602 | 4/1959 | Baker et al. | 64—29 |
| 3,036,447 | 5/1962 | Wilhelmsson et al. | 64—29 |

MARK M. NEWMAN, Primary Examiner

ALLAN D. HERRMANN, Assistant Examiner

U.S. Cl. X.R.

64—29; 133—3